Nov. 9, 1943.    P. M. GRIFFIN    2,333,858
FLEXIBLE SHAFT COUPLING
Filed March 6, 1943

INVENTOR
Percy M. Griffin
ATTORNEY

Patented Nov. 9, 1943

2,333,858

UNITED STATES PATENT OFFICE 2,333,858

FLEXIBLE SHAFT COUPLING

Percy M. Griffin, Albany, N. Y., assignor to Consolidated Car-Heating Company, Inc., Albany, N. Y., a corporation of New York Application March 6, 1943, Serial No. 478,312

5 Claims. (Cl. 74—380)

My invention relates to flexible shaft couplings and particularly but not exclusively to couplings of the type disclosed in Erdman Patent No. 2,261,901.

In practice when joints of this type are used to connect two angularly disposed shafts the coupling, or at least one of the halves thereof, is firmly secured in position by means of a wall or floor bracket. One type of bracket now employed engages one of the half-housings about the exterior portion thereof which forms a bearing for one of the shafts. Another type of bracket which has been suggested is connected to the coupling by the pins which pivotally connect the two half-housings together. When these pivot pins are removed the housings are separated, and hence, where it is necessary to remove a bracket or to shift it from one side of the coupling to the other, the coupling must be taken apart. In joints of this type the gear elements are usually cast and therefore lack the precision of gear elements which are machined. For this reason in assembling the couplings it is frequently necessary to try two or more teeth or gear elements in mesh before a free running assembly is attained. Hence, when the coupling is taken apart in the field to secure a bracket thereto, or to replace or shift a bracket, the chance that the free running arrangement of the meshing elements, as originally assembled, will be maintained is quite remote, and the coupling frequently, if not usually, runs hard or binds completely. Furthermore, any twisting or tilting strain which is applied to the pivot pins through the bracket, as is frequently the case where in installing the coupling the brackets are welded to a wall or floor support, the gear elements are thrown out of proper alignment and therefore do not move freely.

With these difficulties in mind one of the objects of my invention is to provide a flexible shaft coupling with a bracket secured thereto in such a way that it may be removed and replaced on the opposite side of the coupling, or otherwise, without the necessity of taking the coupling apart. Another object is to provide a bracket through which no stress can be applied to the coupling which will disturb the free-running meshing of the gear elements as originally matched and assembled. A further object is to provide a combination coupling and bracket assembly which will provide a wide range of relative movement between the bracket and coupling to facilitate the anchoring of the coupling under various conditions encountered in the installation thereof.

With these objects in view my invention resides in the novel combination and arrangement of elements described below and illustrated in the accompanying drawing in which—

Figure 1:
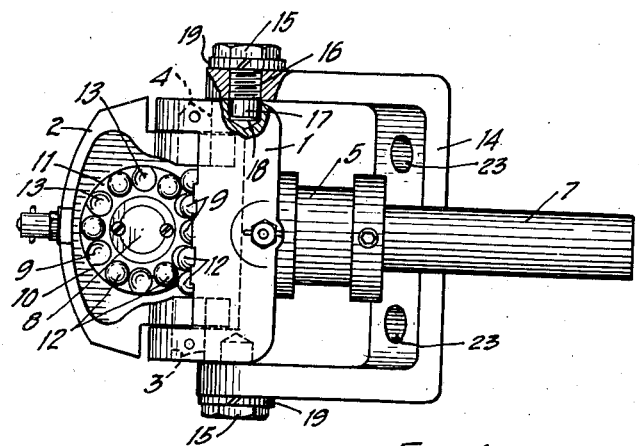
Fig. 1 is a plan view of my flexible coupling and bracket arrangement with certain portions broken away to show inner details of construction.

In the drawing I have illustrated only one type of flexible coupling to which my invention may be applied but it is to be understood that while such joints may differ in their details of construction they all comprise two half-housings containing the cooperating gear elements and which are pivotally connected so that relative movement of the half-housings about the axis of their connection is permitted while the gear elements are maintained in proper cooperative relation. The type of coupling illustrated is the well known "ball type" and comprises half-housings 1 and 2 which are pivotally connect by pins 3 and 4 so that they are relatively movable about the common axis of the pins through an angle of at least 90°. The half-housings 1 and 2 are provided with extensions 5 and 6 respectively which form bearings for the shafts 7 and 8 respectively. Within each half-housing is a gear element 9 which is keyed to the shaft associated with the half-housing in which the gear element is enclosed. In the particular type of joint used for the purpose of illustration the gear elements are alike and each comprises a disc 10 having a front face 11 which is provided with circumferentially arranged hemispherical projections 12 alternating with depressions 13 of a modified hemispherical shape. Thus, when the shafts to which the gears are secured are in alignment with each other, all of the projections on either of the gear elements are received in the depressions of the other element and there is no relative movement of the gears when the shafts are turned. In other words, the gear elements function as a clutch. However, by disposing the pivot pins 3 and 4 on a common axis passing through the common center of one of the interfitting hemispherical depressions and projections, the shaft 7, which is shown at right angles to shaft 8 in Fig. 1, may be moved about the axis of the pivot pins until it is in alignment with shaft 8, or vice versa.

According to the present practice, in installing a coupling at least one of the half-housings is firmly anchored in correct position by means of a bracket (not shown) which is clamped around either the portion 5 of the half-housing 1 or the portion 6 of the half-housing 2 and is bolted or otherwise secured to a wall, ceiling or floor. Such a bracket provides only a limited latitude of arrangement with respect to the coupling because it is clamped in fixed relation thereto. In order to provide a bracket having a greater latitude of arrangement I propose to employ a U-shaped element 14 which will embrace one of the half-housings and be pivotally secured thereto by means of the pivot screws 15. As illustrated in Fig. 1, aligned threaded openings 16 are provided adjacent the ends of the U and the threaded pivot screws 15 which cooperate with these threaded holes have extensions 17 which are received in blind holes 18 in the half-housing 1; the pivot screws being locked by the washers 19. Thus the bracket 14 when installed as illustrated in solid lines in Figs. 1 and 2 may be swung about the axis of the screws 15 until it hits either one of the shafts. If it is more convenient in making the installation to have the bracket on the other side of the coupling the pivot screws 15 may be simply removed and the bracket replaced in the position 14', shown in the dotted outline in Fig. 2, and the screws replaced.

Figure 5:
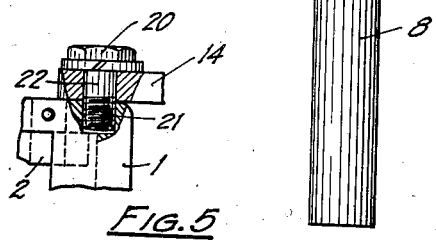
Fig. 5 is a fragmentary plan view, similar to a portion of Fig. 1, but with parts broken away to illustrate an optional type of pin.
Figure 3:
Fig. 3 is a plan view of one type of pin which may be used to connect the bracket to the coupling.
Figure 4:
Fig. 4 is a side elevation view of the pin shown in Fig. 3.

With pivot screws of the type just described the bracket is not tightly clamped in fixed relation to the coupling and relative oscillatory movement of the bracket and coupling about the axis of the pivot screws is permitted. However, by using screws 20 of the type shown in Fig. 5 the bracket and coupling may be clamped tightly together. Here the end portions of the screws are threaded, as shown at 21, and cooperate with threaded opening in the housing 1 instead of with threaded openings in the bracket. The portions 22 of the screws 20 which are positioned within the bracket are not threaded and thus, by tightening the screws 20, the bracket may be clamped in fixed, adjusted relation to the coupling.

Figures 2, 6:
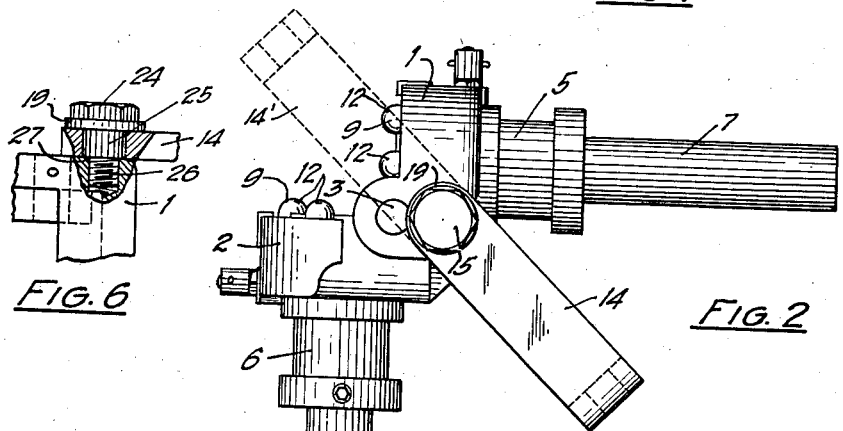
Fig. 2 is a side elevation view of the assembly.
Fig. 6 is a fragmentary plan view similar to Fig. 5 showing a second, optional type of pin.

In Fig. 6 I have shown another type of pivot screw 24, which is provided with an enlarged portion 25 having a running fit in the bracket 14. Here, the end of the screw is threaded, as shown at 26, and cooperates with a threaded opening in housing 1 in a manner similar to the screw 20 shown in Fig. 5. The shoulder, 27, abuts the housing 1 and the distance between the shoulder and the head of the screw is slightly greater than the combined thickness of the washer and the leg of the bracket 14 to permit relative oscillatory movement of the bracket and housing when the shoulder abuts the housing.

In order to facilitate bolting the bracket to a wall or floor fixture holes 23 are provided in the base of the U.

What I claim is:

1. The combination with a flexible shaft coupling comprising two half-housings and means pivotally connecting said half-housings together, of a bracket therefor and means separate from said first mentioned means for pivotally connecting said bracket to one of said half-housings.

2. The combination with a flexible shaft coupling comprising two half-housings and means pivotally connecting said half-housings together, of a bracket therefore and means separate from said first mentioned means for pivotally connecting said bracket to one of said half-housings; the pivotal axes of said connecting means being parallel.

3. The combination with a flexible shaft coupling comprising two half-housings and means pivotally connecting said half-housings together, of a bracket therefor and means separate from said first mentioned means for pivotally connecting said bracket to one of said half-housings; the pivotal axes of said connecting means being parallel and closely adjacent.

4. The combination with a flexible shaft coupling comprisiing two half-housings and means pivotally connecting said half-housings together, of a U-shaped bracket embracing one of said half-housings and means separate from said first mentioned means for pivotally connecting said bracket to said half-housing.

5. The combination with a flexible shaft coupling comprising two half-housings and means pivotally connecting said half-housings together, of a bracket therefor and means separate from the first mentioned means for pivotally connecting said bracket to one of said half-housings and for clamping said bracket in adjusted relation to said coupling.

PERCY M. GRIFFIN.